(12) United States Patent
Lo

(10) Patent No.: US 10,642,707 B2
(45) Date of Patent: May 5, 2020

(54) METHOD FOR INDICATING STATUS OF A STORAGE DEVICE

(71) Applicant: MITAC COMPUTING TECHNOLOGY CORPORATION, Hsinchu (TW)

(72) Inventor: Wei-Yi Lo, Gueishan Township (TW)

(73) Assignee: Mitac Computing Technology Corporation, Hsinchu (TW)

( * ) Notice: Subject to any disclaimer, the term of this patent is extended or adjusted under 35 U.S.C. 154(b) by 0 days.

(21) Appl. No.: 16/451,329

(22) Filed: Jun. 25, 2019

(65) Prior Publication Data
US 2020/0057705 A1     Feb. 20, 2020

(30) Foreign Application Priority Data

Aug. 17, 2018   (TW) .............................. 107128815 A

(51) Int. Cl.
*G06F 11/32* (2006.01)
*G06F 9/54* (2006.01)
*G06F 11/30* (2006.01)

(52) U.S. Cl.
CPC ............ *G06F 11/325* (2013.01); *G06F 9/542* (2013.01); *G06F 11/3034* (2013.01); *G06F 11/3055* (2013.01)

(58) Field of Classification Search
CPC combination set(s) only.
See application file for complete search history.

(56) References Cited

U.S. PATENT DOCUMENTS

| 7,613,843 B1* | 11/2009 | Dhandapani .......... G06F 3/0605 710/15 |
| 2012/0151112 A1* | 6/2012 | Paul .................... G06F 13/4072 710/304 |
| 2015/0067226 A1* | 3/2015 | Iskandar ............. G06F 13/4031 710/309 |
| 2017/0123954 A1* | 5/2017 | Shih .................... G06F 11/3034 |

FOREIGN PATENT DOCUMENTS

| CN | 104516802 A | 4/2015 |
| CN | 106294084 A | 1/2017 |

OTHER PUBLICATIONS

Search Report appended to an Office Action issued to Taiwanese counterpart application No. 107128815 by the TIPO dated Jul. 17, 2019 (4 pages, English translation included).

* cited by examiner

*Primary Examiner* — Ilwoo Park
(74) *Attorney, Agent, or Firm* — Michael Best & Friedrich LLP

(57) ABSTRACT

A method for indicating a status of a storage device to be implemented by a complex programmable logic device (CPLD) is provided. The CPLD is coupled to a connector for connection with the storage device, and to an LED. The method includes: in response to receipt of a signal set from a connector, determining whether the connector is connected with a storage device based on the signal set; when affirmative, identifying the storage device based on the signal set; operating in a mode corresponding to a result of identification; generating a determination result representing an operating status of the storage device based on the signal set; and outputting a control signal corresponding to the determination result to the LED.

10 Claims, 6 Drawing Sheets

METHOD FOR INDICATING STATUS OF A STORAGE DEVICE

CROSS-REFERENCE TO RELATED APPLICATION

This application claims priority to Taiwanese Patent Application No. 107128815 filed on Aug. 17, 2018.

FIELD

The disclosure relates to a method for indicating status of a storage device.

BACKGROUND

A conventional light indicator for a hard disk drive shows an operating status of the hard disk drive according to a logic level of an activity signal transmitted by a connector connected to the hard disk drive. However, for different types of hard disk drives, the activity signals used to represent an identical operating status (e.g., idling or accessing) may be different, so light indication is inconsistent among the different types of hard disk drives. For example, when operating in the accessing status, the activity signal of a hard disk drive supporting a Serial Advanced Technology Attachment (SATA) interface switches between logic-high and logic-low levels at a frequency of 4 Hertz (Hz), whereas the activity signal of a hard disk drive supporting Serial Attached SCSI (SAS) interface switches between logic-high and logic-low levels at a frequency of 1 Hz. In another example, when operating in the idling status, the activity signal of a solid-state drive supporting Peripheral Component Interconnect Express (PCIe) and is at a logic-high level, whereas the activity signal of a hard disk drive supporting SAS or SATA interface is at a logic-low level.

SUMMARY

Therefore, an object of the present disclosure is to provide a method for uniformly indicating status of different types of storage devices that can alleviate at least one of the drawbacks of the prior art.

According to one aspect of the present disclosure, a method for indicating a status of a storage device is provided. The method is to be implemented by a complex programmable logic device (CPLD) that is coupled to a connector adapted for connection with the storage device, and to a visual indicator corresponding to the storage device. The method includes:

in response to receipt of a signal set from the connector, where the signal set includes an activity signal, a first signal that relates to whether the connector is connected with a storage device and that is used for distinguishing whether an interface of the storage device is of a certain type, a second signal that relates to whether the connector is connected with a storage device, and a third signal that relates to whether the connector is connected with a storage device and that is used for distinguishing between types of interfaces of storage devices other than the certain type, determining whether the connector is connected with a storage device based on the first signal, the second signal and the third signal;

when it is determined that the connector is connected with a storage device, identifying the storage device based on the first signal and the third signal;

operating in a mode corresponding to a result of identification of the storage device;

when operating in the mode corresponding to the result of identification of the storage device, generating a determination result representing an operating status of the storage device based on the activity signal; and outputting, based on the determination result, a control signal corresponding to the determination result to the visual indicator for driving the visual indicator to indicate the operating status of the storage device.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
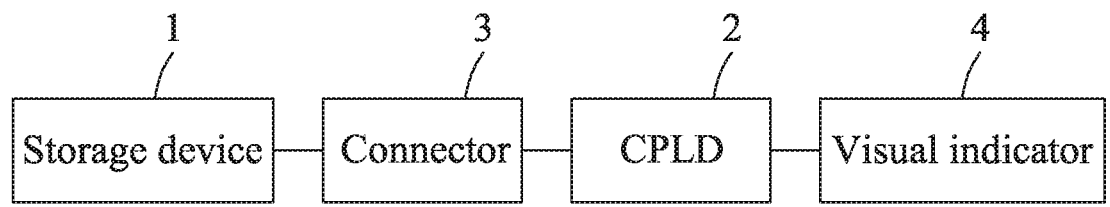
FIG. 1 is a schematic block diagram of a complex programmable logic device (CPLD) electrically connected to a connector, a storage device and a visual indicator, and is used to implement a method for indicating a status of the storage device according to one embodiment of the present disclosure.

Referring to FIG. 1, a complex programmable logic device (CPLD) 2 for implementing a method for indicating a status of a storage device is shown. The CPLD 2 is coupled to a connector 3 adapted for connection with a storage device 1, and is electrically connected to a visual indicator 4 corresponding to the storage device 1. In this embodiment, the visual indicator 4 is a light emitting diode (LED), and may be other visual indicators capable of indicating a status of a storage device. Implementation of the visual indicator 4 of the present disclosure is not limited to the disclosure herein.

In this embodiment, the storage device 1 may support a communication interface of a Peripheral Component Interconnect Express (PCIe), a Serial AT Attachment (SATA), or a Serial Attached SCSI (SAS), but the present disclosure is not limited in this respect. For example, in the case that the storage device 1 supports SATA interface, the connector 3 is a SATA cable having one terminal electrically connected to the storage device 1 and the other terminal electrically connected to a main board (not shown) on which the CPLD 2 is mounted. The CPLD 2 is electrically connected to the connector 3 via traces on the main board. Note that in other embodiments, the CPLD 2 may be disposed on a backplane (not shown) that is directly/indirectly connected to the main board, or may be disposed on the main board and connected to a backplane via the main board which is itself directly/ indirectly connected to the backplane. The storage device 1 can be plugged with the connector 3 on the backplane, or can be connected to the connector 3 through a cable. Since the feature of the present disclosure does not reside in the specific manner of connecting the CPLD 2, the connector 3 and the storage device 1, the present disclosure is not to be limited by the abovementioned examples, and any approach for connecting the CPLD 2, the connector 3 and the storage device 1 may be applicable as long as the CPLD 2 is electrically connected to the storage device 1 and signals from the storage device 1 can be transmitted to the CPLD 2.

Figure 2:
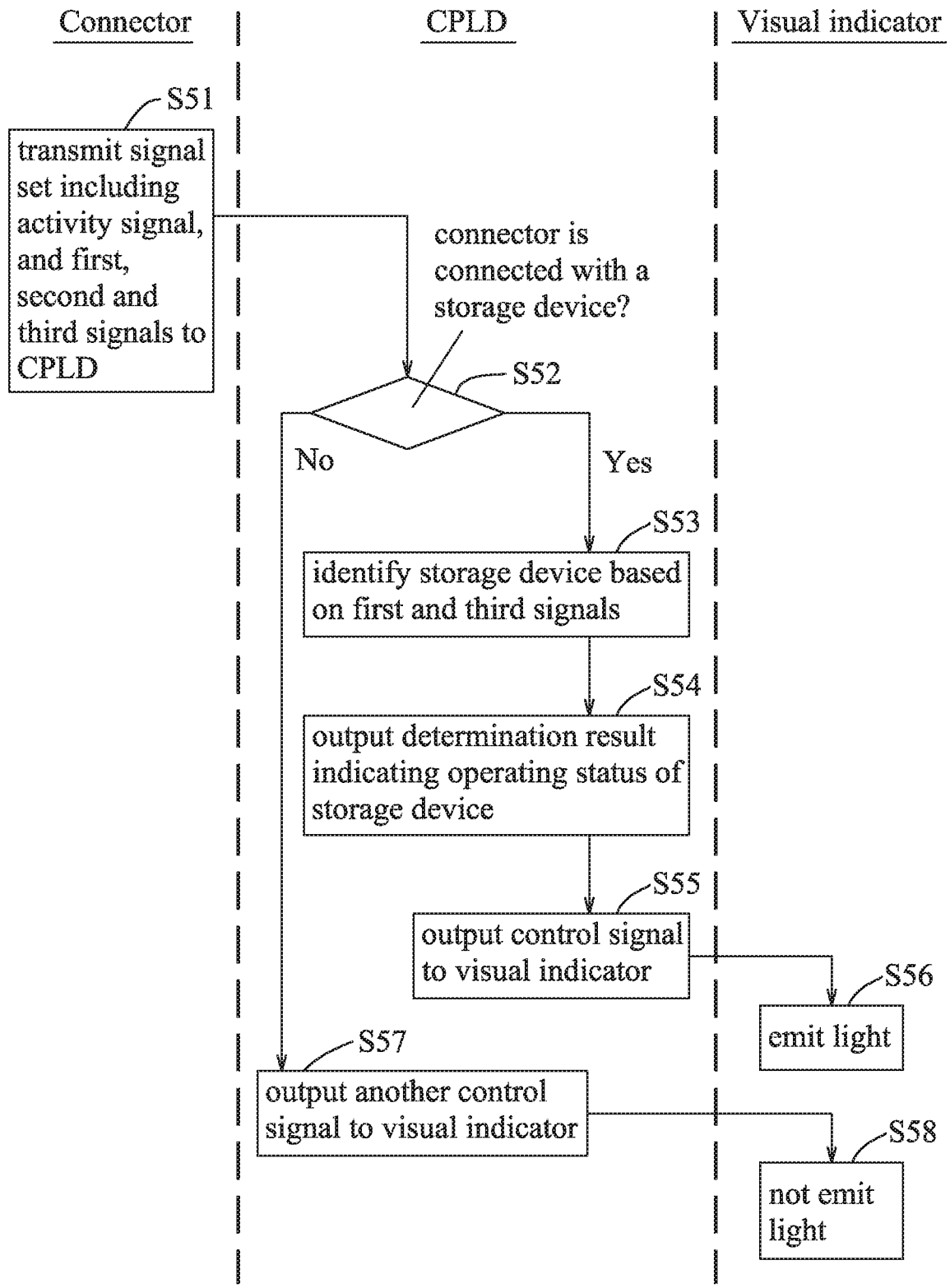
FIG. 2 is a flow chart illustrating the method according to one embodiment of the present disclosure.

Further referring to FIG. 2, the method for indicating a status of the storage device 1 is shown. In step S51, the connector 3 transmits a signal set to the CPLD 2. The signal set includes an activity signal, a first signal, a second signal, and a third signal. The first, second and third signals are related to whether the connector 3 is connected with a storage device. The first signal further serves the purpose of distinguishing whether an interface of a storage device is of a certain type. The third signal further serves the purpose of distinguishing between types of interfaces of storage devices other than the certain type.

TABLE 1

| Type | P10(PRSNT) First signal | P4(IfDet) Second signal | S11(GND) Third signal |
|---|---|---|---|
| SAS HDD | 0 | 0 | 0 |
| SATA HDD | 0 | 0 | 1 |
| PCIe SSD | 1 | 0 | 0 or 1 |
| No storage device | 1 | 1 | 1 |

As shown in Table 1, which represents logic levels of the first to third signals for different storage devices according to the relevant device specifications, for example, the first signal is a PRSNT signal transmitted by P10 pin of the connector 3 (pin number P10), the second signal is an IfDet signal transmitted by P4 pin of the connector 3 (pin number P4), and the third signal is a GND reserved signal transmitted by S11 pin of the connector 3 (pin number S11) but the present disclosure is not limited in this respect.

Additionally, the CPLD 2 is connected to the pins from which the activity signal, the first signal, the second signal and third signal are respectively outputted for receiving the activity signal, and the first, second and third signals. Specifically, in this embodiment, the connector 3 is a PCIe SSD SFF-8639 connector, and the activity signal is transmitted by P11 pin (pin number P11), and the CPLD is coupled to the storage device through the pins (P11 pin, P10 pin, P4 pin and S11 pin) for receiving the signal set including the activity signal and the first, second and third signals.

In step S52, in response to receipt of the signal set from the connector 3, the CPLD 2 determines whether the connector 3 is connected with a storage device based on the first signal, the second signal and the third signal included in the signal set. When it is determined by the CPLD 2 that the connector 3 is connected with a storage device, the flow of the method goes to step S53; otherwise, the flow of the method goes to step S57.

Specifically, in this embodiment, the CPLD 2 determines whether any one of the first signal, the second signal and the third signal is at a logic-low level. When any one of the first, second and third signal is at the logic-low level (i.e., (PRSNT signal) OR (IfDet signal) OR (GND signal)=0), the CPLD 2 determines that the connector 3 is connected with a storage device and the flow of the method goes to step S53. On the other hand, when it is determined by the CPLD 2 that all of the first, second and third signals are at a logic-high level (i.e., (PRSNT signal) AND (IfDet signal) AND (GND signal)=1), the CPLD 2 determines that the connector 3 is not connected with any storage device and the flow of the method goes to step S57.

Figure 3:
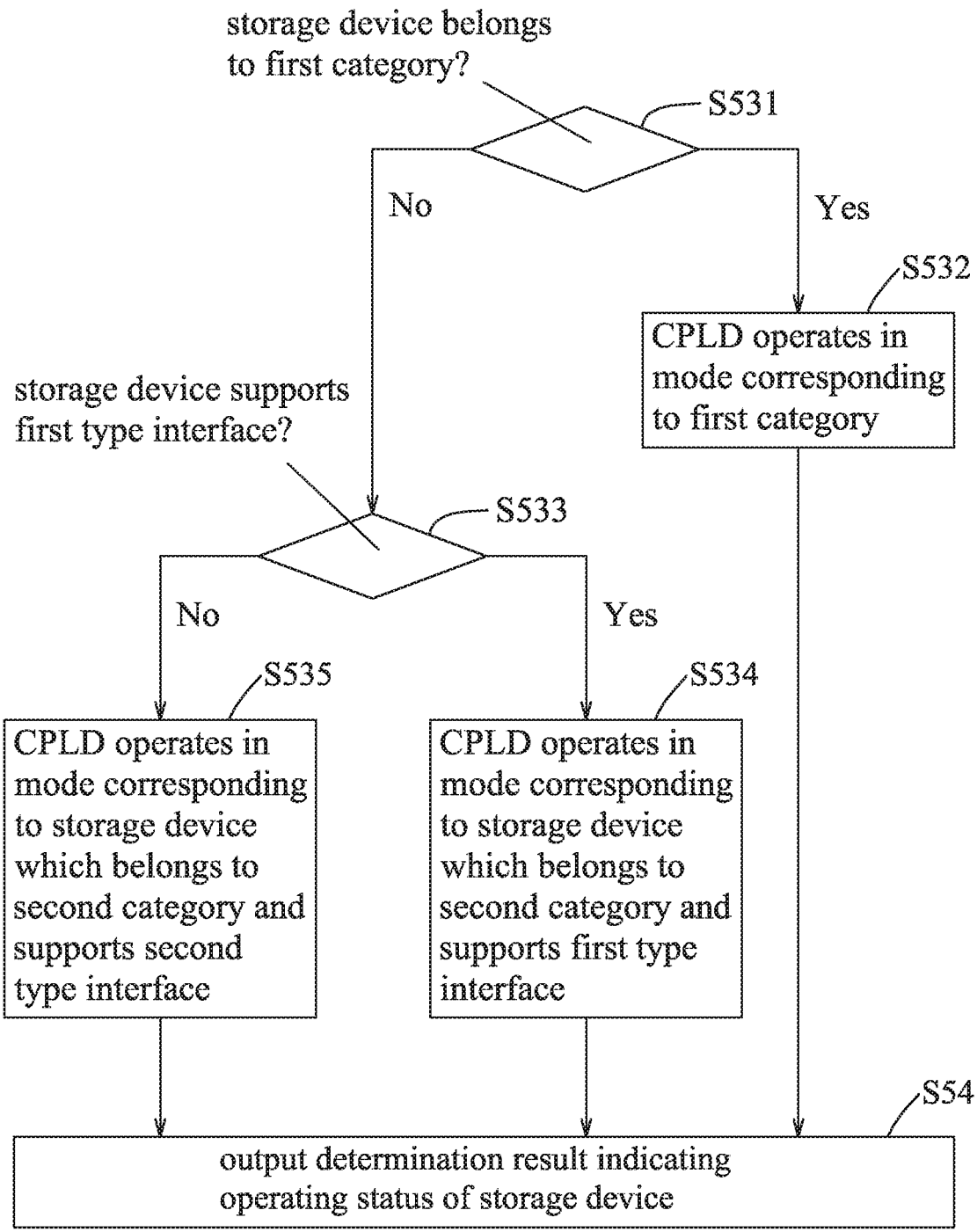
FIG. 3 is a flow chart illustrating a procedure of the method for distinguishing between types of interfaces of the storage device connected to the connector.

In step S53, the CPLD 2 identifies the storage device 1 connected to the connector 3 based on the first signal and the third signal. Further referring to FIG. 3, step S53 includes sub-steps S531 to S535. In sub-step S531, the CPLD 2 determines which one of a first category and a second category the storage device 1 belongs to based on a logic level of the first signal. Specifically, in this embodiment, when the first signal is at the logic-high level, the CPLD 2 determines that the storage device 1 belongs to the first category, and the flow of the method goes to sub-step S532. When the first signal is at the logic-low level, the CPLD 2 determines that the storage device belongs to the second category, and the flow goes to sub-step S533. In this embodiment, the first category is a storage device (e.g., solid state drive (SSD)) that supports the interface of PCIe, and the second category is a storage device (e.g., hard disk drive (HDD)) that does not support the interface of PCIe. In this embodiment, when the storage device 1 belongs to the first category, the storage device 1 is an SSD that supports the interface of PCIe, and when the storage device 1 belongs to the second category, the storage device 1 is an HDD that does not support the interface of PCIe.

In sub-step S532, the CPLD 2 operates in a mode corresponding to the first category (i.e., PCIe SSD).

In sub-step S533, where the storage device 1 is identified as an HDD that does not support the interface of PCIe, the CPLD 2 determines based on the third signal which one of a first type interface and a second type interface the storage device 1 supports. Specifically, in this embodiment, when it is determined that the third signal is at the logic-low level, the CPLD 2 determines that the storage device 1 supports the first type interface, and the flow of the method goes to sub-step S534. When it is determined that the third signal is at the logic-high level, the CPLD 2 determines that the storage device 1 supports the second type interface, and the flow of the method goes to sub-step S535. It should be noted that in this embodiment, the first type interface is Serial Attached SCSI (SAS), and the second type interface is Serial AT Attachment (SATA), but the present disclosure is not limited in this respect. That is to say, when it is determined by the CPLD 2 that the third signal is at the logic-low level, the storage device 1 is determined to be supporting the first type interface, i.e., SAS interface. When it is determined by the CPLD 2 that the third signal is at the logic-high level, the storage device 1 is determined to be supporting the second type interface, i.e., SATA interface.

In sub-step S534, the CPLD 2 operates in a mode corresponding to a storage device which belongs to the second category and supports the first type interface (i.e., SAS HDD). In sub-step S535, the CPLD 2 operates in a mode corresponding to a storage device which belongs to the second category and supports the second type interface (i.e., SATA HDD).

Subsequent to sub-steps S532, S534 and S535, the flow of the method goes to step S54. In step S54, the CPLD 2, which operates in the mode corresponding to the result of identification of the storage device 1 (i.e., the mode corresponding to the first category, the mode corresponding to a storage device that belongs to the second category and supports the first type interface, or the mode corresponding to a storage device that belongs to the second category and supports the second type interface), generates, based on the activity signal, a determination result indicating an operating status of the storage device 1.

Figure 4:
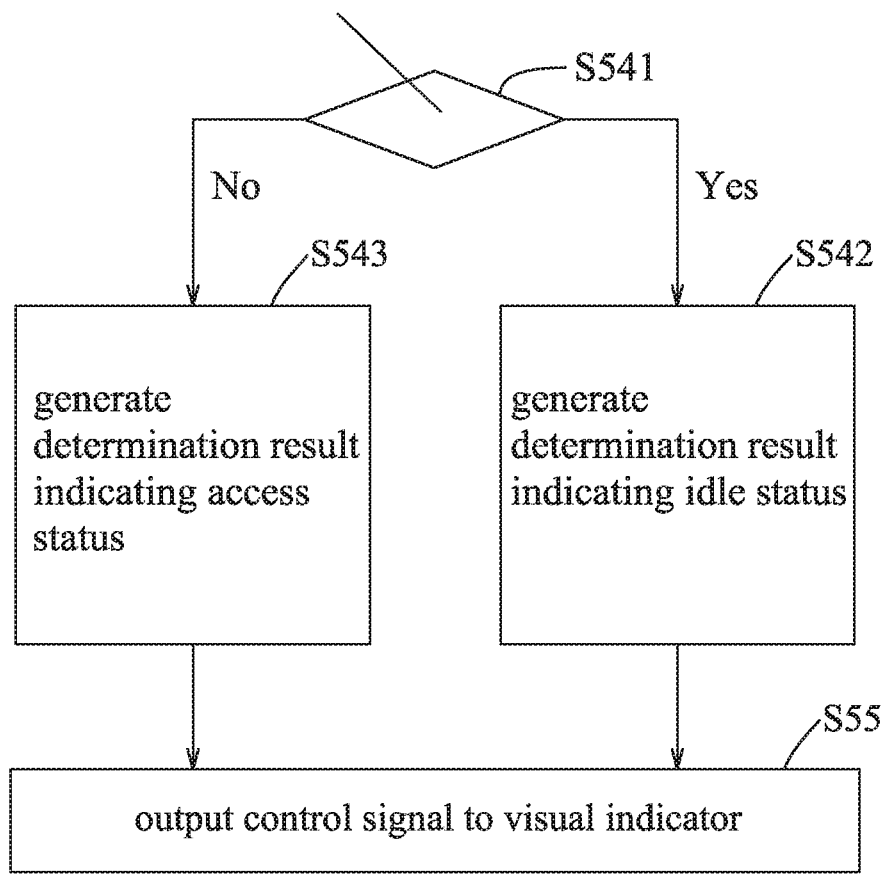
FIG. 4 is a flow chart illustrating sub-steps of the method according to one embodiment for generating a determination result that indicates an operating status of the storage device.

Further referring to FIG. 4, step S54 includes sub-steps S541 to S543. In sub-step S541, the CPLD 2, which operates in the mode corresponding to the result of identification made in steps S53, determines whether the activity signal remains at the same logic level. When it is determined that the activity signal remains at the same logic level, the flow of the method goes to sub-step S542; otherwise, the flow of the method goes to sub-step S543.

Figure 5:
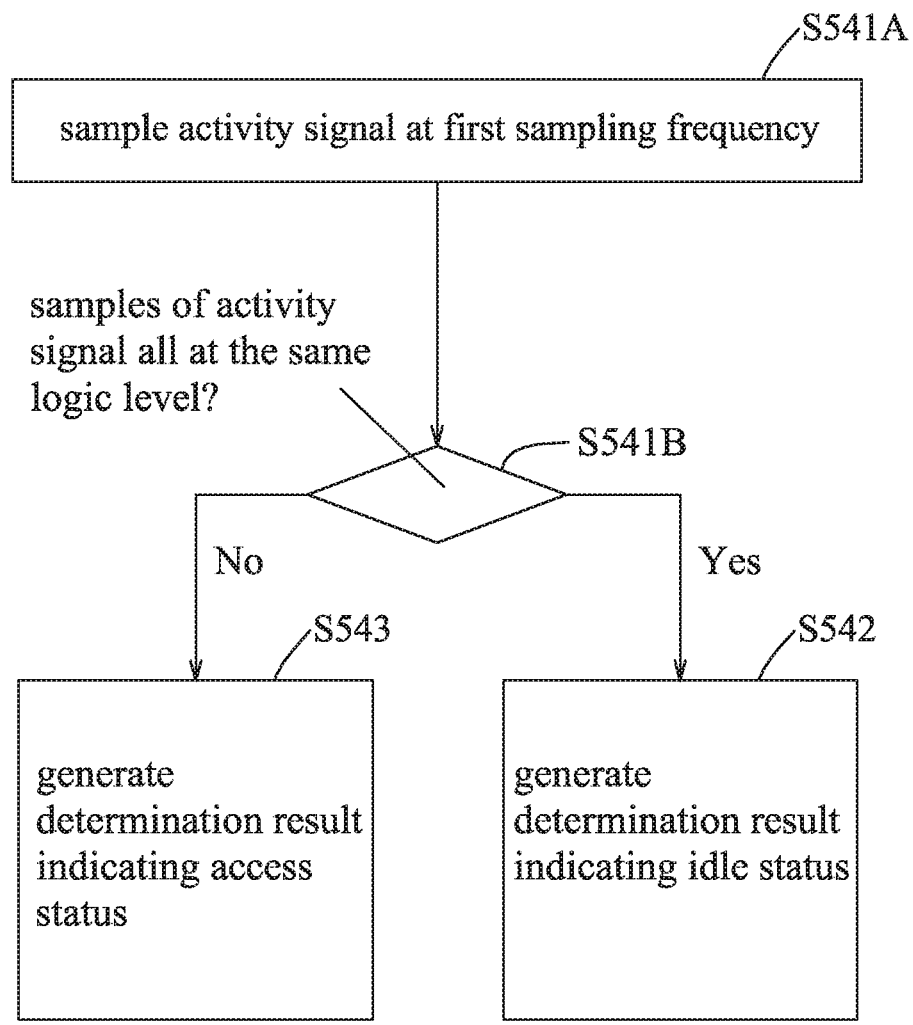
FIG. 5 is a flow chart illustrating a procedure of the method according to one embodiment for determining whether an activity signal remains at the same logic level.

Further referring to FIG. 5, for a scenario that the CPLD 2 operates in the mode corresponding to the first category (i.e., the storage device 1 is identified as a PCIe SSD), or in the mode corresponding to a storage device which belongs to the second category and supports the first type interface (i.e., the storage device 1 is identified as an SAS HDD), sub-step S541 includes sub-steps S541A and S541B.

In sub-step S541A, the CPLD 2 samples the activity signal at a first sampling frequency. Note that in this embodiment, the first sampling frequency is 1 Hertz (Hz), but the present disclosure is not limited in this respect. Subsequent to sub-step S541A, sub-step S541B is performed.

In sub-step S541B, the CPLD 2 determines whether samples obtained by sampling the activity signal are all at the same logic level to determine whether the activity signal remains at the same logic level. When it is determined by the CPLD 2 that the samples are all at the same logic level, the activity signal is determined to be remaining at the same logic level, and the flow of the method goes to sub-step S542; otherwise, the flow goes to sub-step S543.

Figure 6:
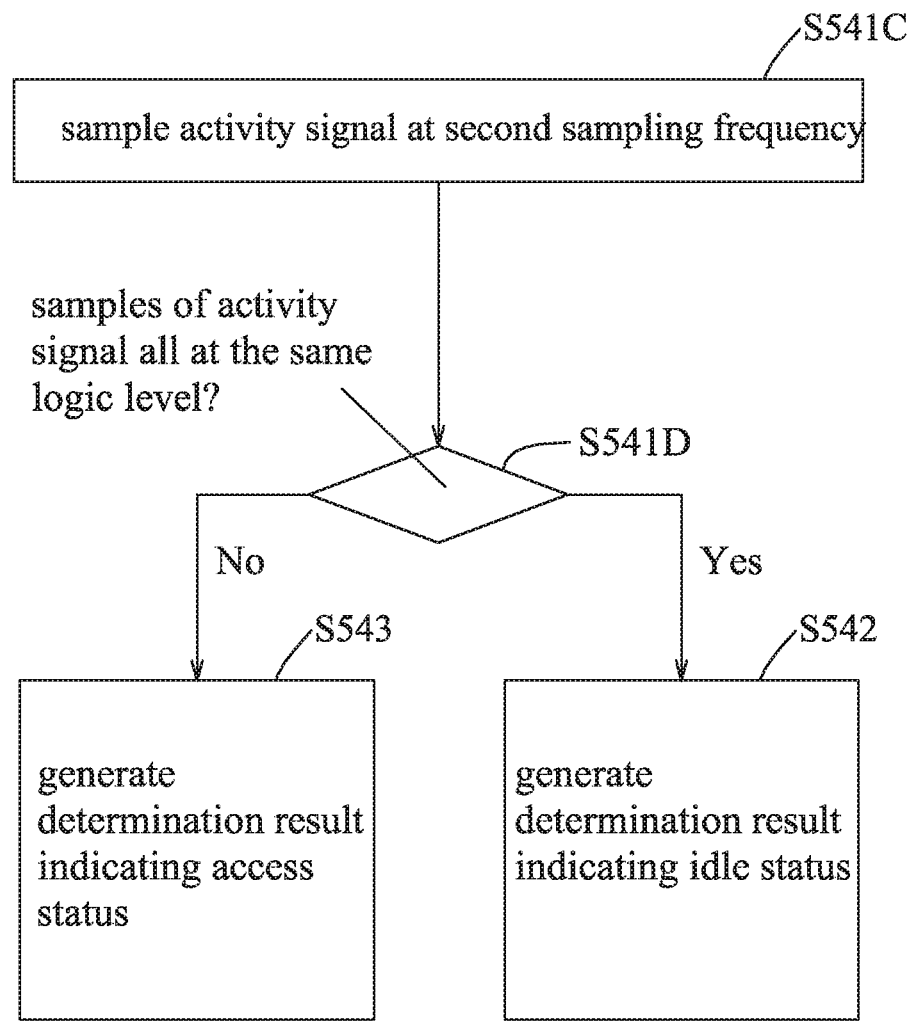
FIG. 6 is a flow chart illustrating another procedure of the method according to one embodiment for determining whether the activity signal remains at the same logic level.

Referring to FIG. 6, for a scenario that the CPLD 2 operates in the mode corresponding to a storage device which belongs to the second category and supports the second type interface (i.e., the storage device 1 is determined as a SATA HDD), sub-step S541 includes sub-steps S541C and S541D.

In sub-step S541C, the CPLD 2 samples the activity signal at a second sampling frequency different from the first sampling frequency. It should be noted that in this embodiment, the second sampling frequency is 4 Hz, but the present disclosure is not limited to this example. Subsequent to sub-step S541C, sub-step S541D is performed.

In sub-step S541D, the CPLD 2 determines whether samples obtained by sampling the activity signal are all at the same logic level to determine whether the activity signal remains at the same logic level. When it is determined by the CPLD 2 that the samples are all at the same logic level, the activity signal is determined to be remaining at the same logic level, and the flow of the method goes to sub-step S542; otherwise, the flow goes to sub-step S543.

In sub-step S542, the CPLD 2 generates a determination result indicating that the storage device 1 is in an idle status. That is, the storage device 1 is powered on and no task is being executed thereby.

In sub-step S543, the CPLD 2 generates a determination result indicating that the storage device 1 is in an access status. That is, the storage device 1 is powered on and is executing a task.

Referring back to FIG. 2, subsequent to step S54, step S55 is performed. In step S55, the CPLD 2 outputs, based on the determination result, a control signal corresponding to the determination result to the visual indicator 4 for driving the visual indicator 4 to indicate the operating status of the storage device 1. It should be noted that, in this embodiment, when the determination result represents that the storage device 1 is in the idle status, the control signal remains at a logic-high level. On the other hand, when the determination result represents that the storage device 1 is in the access status, the control signal switches between a logic-low level and the logic-high level. Note that a frequency at which the control signal switches between the logic-low level and the logic-high level may be the same as one of the first and second sampling frequencies, or may be different from the first and second sampling frequencies.

In step S56, in response to receipt of the control signal, the visual indicator 4 indicates the operating status of the storage device 1 based on the control signal. In this embodiment, the visual indicator 4 is an LED, emits light when the control signal is at the logic-high level, and does not emit light when the control signal is at the logic-low level, but the present disclosure is not limited in this respect. In this embodiment, the LED emits light continuously to indicate the idle status when the control signal remains at the logic-high level, and the LED blinks to indicate the access status when the control signal switches between the logic-low level and the logic-high level.

In step S57, the CPLD 2 outputs another control signal to the visual indicator 4 for driving the visual indicator 4 to indicate that the connector 3 is not connected with any storage device. In this embodiment, the another control signal outputted in step S57 is at the logic-low level but the present disclosure is not limited in this respect. Subsequent to step S57, step S58 is performed.

In step S58, in response to receipt of the another control signal, the visual indicator 4 does not emit light based on the another control signal. In this embodiment, the LED does not emit light to indicate that the connector 3 is not connected with any storage device when the control signal is at the logic-low level.

It should be noted that the control signal and the another control signal respectively generated in step S55 and S57 are provided for the purpose of controlling light emission of the visual indicator 4 to notify a user of an operating status of the storage device 1 or of the absence of connection to any storage device of the connector 3 (that the connector 3 is not connected with any storage device). A person having ordinary skill in the pertinent art is capable of modifying the control signals to obtain similar effect of the present disclosure.

To sum up, by virtue of the method described in the present disclosure, the CPLD 2 is capable of determining whether the connector 3 is connected with a storage device based on the first, second and third signals. Further, when it is determined that the connector 3 is connected with a storage device, the CPLD 2 identifies a category of and/or a type of the interface of the storage device 1 based on the first and third signals, and operates in the mode corresponding to a result of identification of the storage device 1. Then, the CPLD 2 generates a determination result representing an operating status of the storage device 1 based on the activity signal, and outputs the control signal remaining at a logic-high level or switching between logic-high and logic-low levels to drive the visual indicator 4 to continuously emit light or to flash accordingly. On the other hand, when it is determined that the connector 3 is not connected with any storage device, the CPLD 2 outputs the control signal at the logic-low level to control the visual indicator 4 not to emit light. In this way, the visual indicator 4 is controlled by the CPLD 2 to present uniform light indication for an identical operating status of different types of storage devices with different types of interfaces. Misjudgment resulting from inconsistency in light indication for the same operating status among different types of storage devices or different types of interfaces of storage devices may be avoided. Specifically, the visual indicator 4 continuously emits light to indicate that the storage device 1 is in an idle status, the visual indicator 4 flashes to indicate that the storage device 1 is in an access status, and the visual indicator 4 does not emit light to indicate that the connector 3 is not connected with any storage device. In addition, the frequency at which the visual indicator 4 blinks to indicate the access status is the same regardless of which type of storage device is used, so as to facilitate management of storage devices.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for indicating a status of a storage device, the method to be implemented by a complex programmable logic device (CPLD) that is coupled to a connector adapted for connection with the storage device (1), and to a visual indicator corresponding to the storage device, the method comprising:
    in response to receipt of a signal set from the connector, where the signal set includes an activity signal, a first signal that relates to whether the connector is connected with a storage device and that is used for distinguishing whether an interface of the storage device is of a certain type, a second signal that relates to whether the connector is connected with a storage device, and a third signal that relates to whether the connector is connected with a storage device and that is used for distinguishing between types of interfaces of storage devices other than the certain type, determining whether the connector is connected with a storage device based on the first signal, the second signal and the third signal;
    when it is determined that the connector is connected with a storage device, identifying the storage device based on the first signal and the third signal;
    operating in a mode corresponding to a result of identification of the storage device;
    when operating in the mode corresponding to the result of identification of the storage device, generating a determination result representing an operating status of the storage device based on the activity signal; and
    based on the determination result, outputting a control signal corresponding to the determination result to the visual indicator for driving the visual indicator to indicate the operating status of the storage device;
    wherein the step of operating in a mode corresponding to a result of identification includes:
        when it is determined that the connector is connected with the storage device, determining, based on the first signal, which one of a first category and a second category the storage device belongs to;
        when it is determined that the storage device belongs to the first category, operating in a mode corresponding to the first category;
        when it is determined that the storage device belongs to the second category, determining, based on the third signal, which one of a first type interface and a second type interface the storage device supports;
        when it is determined that the storage device supports the first type interface, operating in a mode corresponding to a storage device which belongs to the second category and supports the first type interface; and
        when it is determined that the storage device supports the second type interface, operating in a mode corresponding to a storage device which belongs to the second category and supports the second type interface;
    wherein the step of generating the determination result includes:
        when the CPLD operates in the mode corresponding to the first category, or in the mode corresponding to a storage device which belongs to the second category and supports the first type interface, sampling the activity signal at a first sampling frequency; and
        when the CPLD operates in the mode corresponding to a storage device which belongs to the second category and which supports the second type interface, sampling the activity signal at a second sampling frequency different from the first sampling frequency.

2. The method as claimed in claim 1, wherein the first category is a solid state drive that supports the interface of Peripheral Component Interconnect Express (PCIe), and the second category is a hard disk drive that does not support the interface of PCIe.

3. The method as claimed in claim 1, wherein the first type interface is Serial Attached SCSI (SAS), and the second type interface is Serial AT Attachment (SATA).

4. The method as claimed in claim 1, wherein the step of generating a determination result includes:
    when operating in the mode corresponding to the result of identification of the storage device, determining whether the activity signal remains at the same logic level;
    when it is determined that the activity signal remains at the same logic level, generating a determination result indicating that the storage device is in an idle status; and
    when it is determined that the activity signal does not remain at the same logic level, generating a determination result indicating that the storage device is in an access status.

5. The method as claimed in claim 4, wherein the step of determining whether the activity signal remains at the same logic level includes:

determining whether samples obtained by sampling the activity signal are all at the same logic level to determine whether the activity signal remains at the same logic level.

6. The method as claimed in claim 1, subsequent to the step of determining whether the connector is connected with a storage device, further comprising:

when it is determined that the connector is not connected with any storage device, outputting another control signal to the visual indicator for driving the visual indicator to indicate that the connector is not connected with any storage device.

7. The method as claimed in claim 1, wherein the first signal is a PRSNT signal.

8. The method as claimed in claim 1, wherein the second signal is an IfDet signal.

9. The method as claimed in claim 1, wherein the third signal is a GND signal.

10. The method as claimed in claim 1, wherein the step of determining whether the connector is connected with a storage device includes:

determining whether any one of the first signal, the second signal and the third signal is at a logic-low level.

\* \* \* \* \*